Jan. 6, 1959  E. HUGGINS  2,867,187
MEASURING TAPE
Filed Feb. 3, 1958
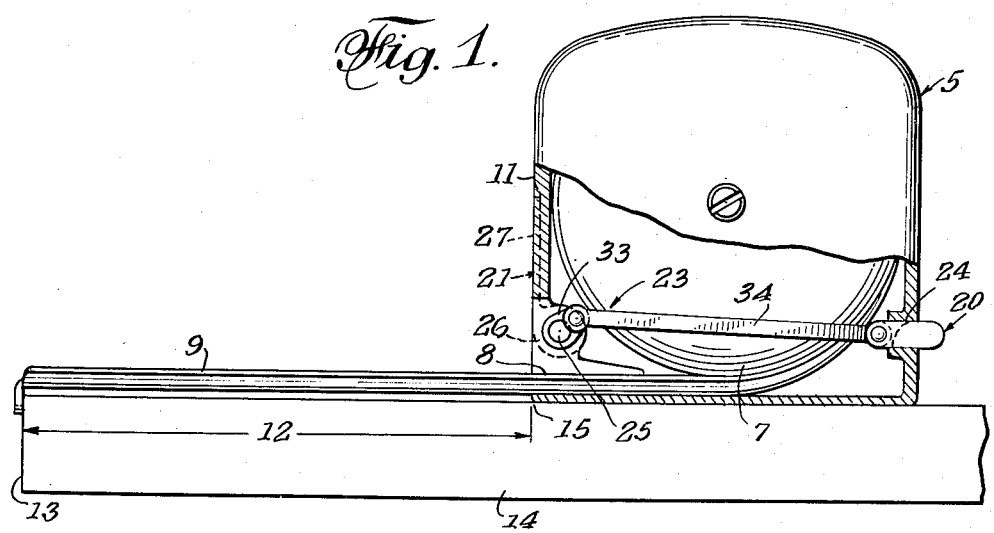
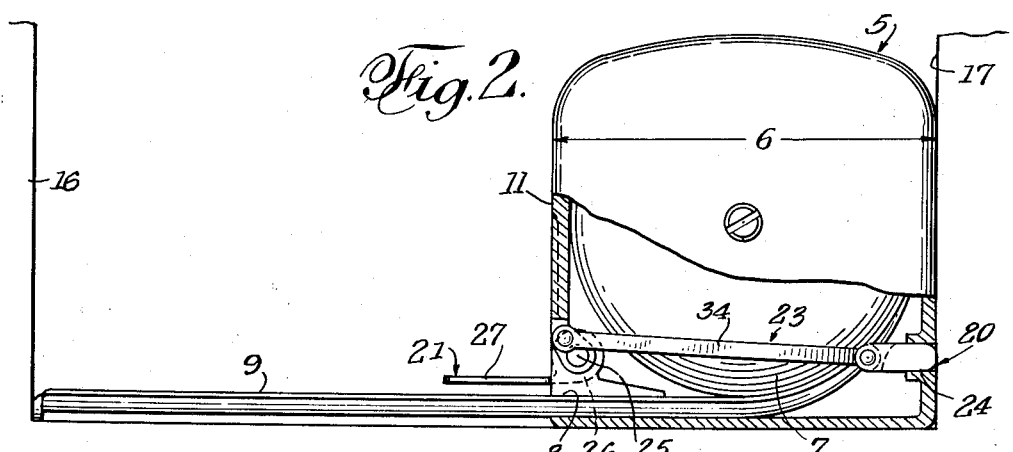
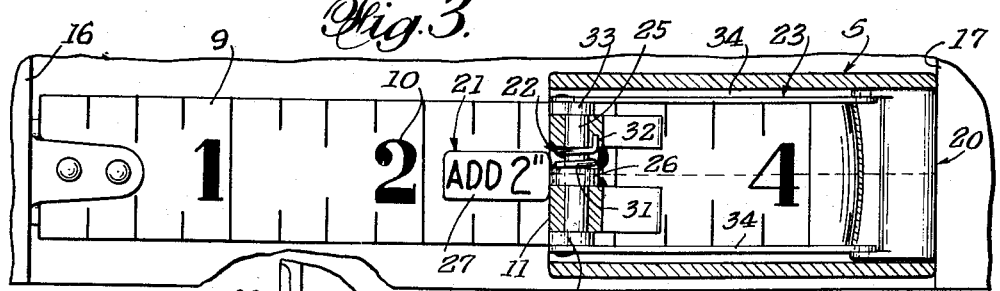
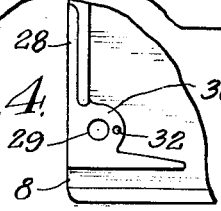
INVENTOR.
EARL HUGGINS
BY C. G. Stratton
ATTORNEY

United States Patent Office 2,867,187
Patented Jan. 6, 1959

2,867,187

MEASURING TAPE

Earl Huggins, Los Angeles, Calif.

Application February 3, 1958, Serial No. 712,965

7 Claims. (Cl. 116—132)

This invention relates to a measuring tape and deals more particularly with a tape structure that includes a housing in which the tape is coiled or wound.

Measurements taken in exposed places are easily read on such a tape, the measurement being determined by the reading at the point where the tape protrudes from the housing. When it is necessary to take an inside measurement, that is, a measurement between two members between which the tape is stretched, it is necessary to add to the measurement that shows on the tape a distance equal to the width of the housing in order to obtain the proper dimension. However, this addition to the measurement that is being read is frequently forgotten. Thus, if the width of the housing is two inches, as is usually the case, the measurement read is two inches short, and this causes error, as can be well understood.

Accordingly, it is an object of the present invention to provide a measuring tape that is wound within a housing and includes in the structure thereof means advising the user that the width of the housing, a standard dimension, is to be added to whatever dimension is readable on the extending portion of the tape.

Another object of the invention is to provide a measuring tape of the character above referred to in which a telltale element is moved into the area or across the area of the tape that is being read by the simple placement of the housing of the tape in position to effect an inside measurement between two members.

A further object of the invention is to provide means of the character above referred to that requires but a small operating movement of the means for advising that an additional measurement increment is to be added to the measurement shown on the tape to effect a movement of the telltale means from a folded or out-of-the-way position to a position advising that such increase of the measurement be added to the reading on the tape.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawings, like reference characters designate similar parts in the several views.

Fig. 1 is a side elevational view, partly in cross section, showing a measuring tape embodying the telltale means of the present invention, the said means being shown in the out-of-the-way position that it retains during all uses of the tape for outside measurements.

Fig. 2 is a similar view showing the measuring tape in position to measure an inside distance, the means having been moved to advise that an increment of distance, the width of the tape housing, is to be added to the measurement shown on the tape in operated position.

Fig. 3 is a plan sectional view of Fig. 2 taken immediately above the extended measuring tape and showing the present mechanism in telltale position.

Fig. 4 is a fragmentary vertical detailed view of a portion of one of the housing parts of the two-part housing used in the present invention.

The drawing shows a generally conventional two-part housing 5 that may be of any desired height and of any desired thickness but is preferably of a standard width across the dimension 6. In the usual device of this nature, the dimension 6 is two inches, but the same may vary, as can be understood. The measuring tape further conventionally includes a wound-up tape 7 that may be drawn through an opening 8 in an end of the housing 5 so that the extended end 9 of the tape and the graduations 10 thereon may be viewed and read with respect to the end 11 of the housing 5.

As can be seen from Fig. 1, the tape end 9 has been extended from the housing 5 a distance 12, and it will be clear that this distance, shown in Fig. 3, as 2⅜ inches, is the measurement between the end 13 of the board 14 and the point 15 on said board. It is clear, under these circumstances, that the housing does not enter in any way in determining the degree or length of the measurement 12. However, if it is necessary to take a measurement between a member 16 and a member 17 and it is essential, in taking said measurement, that the measuring tape be disposed in the space between the members 16 and 17, it will be clear that the width 6 of the housing 5 enters into the dimension or measurement of distance between the members 16 and 17. Thus, the dimension will be read as 2⅜ inches plus the dimension 6, which is usually two inches, giving a total of 4⅜ inches as the measurement between the members 16 and 17. It is the inadvertent omission of the dimension 6 in determining the proper distance across members 16 and 17 that the present means is devised to obviate.

The present improvement comprises an actuator 20 that is housed in and normally extends beyond the end of the housing 5 that is opposite the end 11, a telltale 21 normally disposed in recessed or retracted relation in said housing end 11 and not visible to the user of the tape when so disposed, a spring 22 to bias said telltale to the mentioned attracted position, and means 23 interconnecting the actuator 20 and the telltale 21 to move the latter to a telltale position superimposed over the end 9 of the tape upon retraction of the former when the housing 5 is placed in position to measure an inside measurement.

The actuator 20 is here shown as a transverse slide that is housed in a slide-way 24, provided in the housing and, while shown as extending across the thickness of the housing, may be smaller in extent than as shown. Said slide is so formed as to be clear of the wound-up tape 7 in all positions thereof.

The telltale is shown as a lever that is carried on a transverse pivot pin 25 in the housing 5, said lever having a hub 26 that is affixed to said pin and a generally flattened extension arm 27. In the retracted postion of the telltale 21, said arm 27 is housed in a recess 28 formed in the housing end 11, the shaft 25 having bearing in a transverse bore 29 in said housing end. On either side of the hub 26 of the telltale the housing is provided with a pair of bosses 30 that locate the telltale.

While the spring 22 may take various forms, the same is here shown as a coil torsion spring 31 having one end anchored in one of the bosses 30, as at 32, and the other end affixed to the telltale, preferably to the hub 26 thereon. It will be clear that said spring is so formed as to bias the telltale to the retracted position of Fig. 1 whereby the same is not visible to the user of the measuring tape.

The interconnecting means at 23 is shown as an arm 33 affixed to each end of the shaft 25 and a pair of links 34 connecting said arms to the actuator slide 20. The arms 33 are so disposed as to constitute the cranks that tilt under movement of the links 34 as imparted by the actuator slide 20. As can be seen in Fig. 2, when the present measuring tape is placed in position to take an inside measurement, the actuator 20 is retracted by the member 17 or any comparable member, and the same, through the medium of the links 34 and the cranks 33, effects a rotation of the telltale on the pivot shaft 25 so that the arm portion 27 of said telltale overstands the extending end 9 of the tape while in measuring position. Thus, a person taking a reading of the measurement, as shown, is apprized by the indicia on said tape to add a certain additional increment of measurement as, for instance, two inches, as shown in the present case.

Since the actuator 20 operates against the bias of the spring 22, it will be clear that, upon removal of the measuring tape from the place of measurement, said spring will restore the parts to the position of Fig. 1 wherein the actuator is again projected and the telltale again retracted.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. In a measuring tape having a housing provided with an opening and a wound-up tape disposed in said housing and adapted to have its end drawn outward through said opening to measure, the improvement that comprises, a normally-retracted telltale carried by the housing adjacent said opening, and means carried by the housing and connected to the telltale and operable to move the latter to extended position superimposed over the tape at the point of its egress from the housing, said telltale being provided with indicia advising the addition of the width of the housing to the measurement shown at said point of egress for all inside measurements.

2. In a measuring tape according to claim 1, the last-mentioned means including an actuator that extends outwardly from the end of the housing that is opposite to the end from which the tape is drawn when the telltale is retracted.

3. In a measuring tape according to claim 1, the last-mentioned means including an actuator that extends outwardly from the end of the housing that is opposite to the end from which the tape is drawn when the telltale is retracted, and spring means biasing said telltale to retracted position and the actuator to projected position.

4. In a measuring tape having a housing provided with an opening and a wound-up tape disposed in said housing and adapted to have its end drawn outward through said opening to measure, the improvement that comprises, a normally-retracted telltale carried by the housing adjacent said opening, a spring biasing said telltale to said retracted position, an actuator connected to said telltale and normally extending from the end of the tape housing that is opposite to the end provided with the telltale and operable to project the telltale against the bias of the spring.

5. In a measuring tape having a housing provided with an opening and a wound-up tape disposed in said housing and adapted to have its end drawn outward through said opening to measure, the improvement that comprises, a normally-retracted telltale carried by the housing adjacent said opening, a spring biasing said telltale to said retracted position, an actuator connected to said telltale and normally extending from the end of the tape housing that is opposite to the end provided with the telltale and operable to project the telltale against the bias of the spring, said telltale being provided with indicia advising the addition of the width of the housing between said ends to the measurement shown at the point of egress of the tape from the housing, said indicia being placed on the telltale to be visible only when the telltale is projected, and means interconnecting the telltale and the actuator to project the former upon retraction of the latter.

6. In a measuring tape having a housing having an opening in one edge and a wound-up tape disposed in said housing and adapted to have its end drawn outwardly through said opening to measure, the improvement that comprises a normally-retracted member carried by the housing adjacent to said opening, and means connected to said member and projecting beyond the opposite edge of the housing and operable to project the normally-retracted member to a superimposed position over the tape to apprise the user of the tape to add the width of the housing to the measurement when an inside measurement is being taken.

7. In a measuring tape according to claim 6, a spring being connected to said member to resiliently bias the same to retracted positions, the means connected to said member, when operated, moving the member against the bias of the spring.

References Cited in the file of this patent
UNITED STATES PATENTS 2,076,704   Carlson _____ Apr. 13, 1937